United States Patent [19]

Iwao et al.

[11] 4,158,088

[45] Jun. 12, 1979

[54] PROCESS FOR THE POLYMERIZATION OF ETHYLENE OR α-OLEFINS AND CATALYST THEREFOR

[75] Inventors: Tetsuya Iwao, Zushi; Masahiro Kono, Manazuru; Heizo Sasaki, Tokyo; Akira Ito, Yokohama, all of Japan

[73] Assignee: Mitsui Toatsu Chemicals, Inc., Tokyo, Japan

[21] Appl. No.: 816,066

[22] Filed: Jul. 15, 1977

[30] Foreign Application Priority Data

Jul. 15, 1976 [JP] Japan ........................ 51-83504
Jul. 15, 1976 [JP] Japan ........................ 51-83505

[51] Int. Cl.$^2$ .................... C08F 4/66; C08F 10/06
[52] U.S. Cl. ........................ 526/128; 252/429 B; 252/429 C; 526/119; 526/127; 526/133; 526/139; 526/140; 526/141; 526/142; 526/153; 526/351; 526/903; 526/906
[58] Field of Search ............. 252/429 B, 429 C; 526/119, 127, 128, 133, 139–142, 158, 906, 903, 153

[56] References Cited

U.S. PATENT DOCUMENTS

| | | | |
|---|---|---|---|
| 3,004,962 | 10/1961 | Matlack | 526/906 |
| 3,701,763 | 10/1972 | Wada et al. | 526/906 |
| 3,850,899 | 11/1974 | Wada et al. | 526/906 |

FOREIGN PATENT DOCUMENTS

| | | | |
|---|---|---|---|
| 1300734 | 12/1972 | United Kingdom | 526/903 |
| 1384603 | 2/1975 | United Kingdom | 526/903 |

*Primary Examiner*—Edward J. Smith
*Attorney, Agent, or Firm*—Sughrue, Rothwell, Mion, Zinn and Macpeak

[57] ABSTRACT

Polymerization of ethylene or α-olefins is carried out with use of a catalyst comprising a modified titanium component obtained by pulverizing the starting titanium component of Ziegler solid catalysts and subjecting the resultant to a modification treatment through contact with an inert organic solvent or a mixture thereof with a modifier, and an organoaluminum component.

The pulverized product of the starting titanium component is pulverized together with an organoaluminum compound and a small amount of ethylene or α-olefins thereby controlling the particle size distribution.

17 Claims, No Drawings

PROCESS FOR THE POLYMERIZATION OF ETHYLENE OR α-OLEFINS AND CATALYST THEREFOR

BACKGROUND OF THE INVENTION

This invention relates to a process for the polymerization of ethylene or α-olefins for providing polymers with an improved particle size distribution and a high stereoregularity, and a catalyst therefor.

The most typical Ziegler catalysts which are used for the polymerization of ethylene or α-olefins comprises a titanium compound-containing catalyst component and an organoaluminum compound.

It is well-known that a catalyst activity is improved by pulverizing a titanium catalyst component such as titanium trichloride and its compositions (for example, Japanese Patent Publication Nos. 14125/60 and 24271/64), by copulverizing the titanium component with various modifiers (for example, Japanese Patent Publication Nos. 24270/64, 24272/64, 10065/68, British Pat. No. 1087314, U.S. Pat. No. 3764591, Japanese Application Kokai Nos. 48-68497, 48-29694, 48-38295 and 49-53196), or by subjecting these pulverized products to a modification treatment of contacting with an organic solvent or a mixture thereof with a modifier and separating (for example, U.S. Pat. No. 3850899, Japanese Patent Publication Nos. 48638/74, 17319/75, 48637/74 and British Pat. No. 1370559).

With these treatments the catalyst performance is improved to some degree, but they have various disadvantages. For example, a polymerization activity is improved but a stereoregularity is lowered, or both of the polymerization activity and stereoregularity are improved but a particle size distribution of the titanium catalyst component is broadened. Particularly, when pulverized products of the starting titanium component are subject to the modification treatment with organic solvents, they are divided to fine particles and broadened in the particle size distribution, in which more than 10% by weight of the particles has a size smaller than 5 microns.

When homopolymerization or copolymerization of ethylene or α-olefins is carried out using Ziegler type catalysts comprising a titanium component and an organoaluminum compound, the particle size of the resulting polymer or copolymer is markedly influenced by the particle size of the titanium component used.

Thus, when using the modified titanium component having a wide particle size distribution, in which fine particles are included in large quantities, the resulting homopolymers or copolymers have also a wide particle size distribution, in which fine powders of less than 50 microns are usually included in an amount of 10 to 30% by weight.

When the polymers obtained have a wide particle size distribution and particularly, contain a large amount of fine powders, separating of the polymers from a solvent by filtrating or centrifuging encounters a difficulty and further, owing to scattering of the polymer fine powders in the drying and pelletizing steps, the loss of polymers increases.

Thus, superfluous equipments must be provided for overcoming such disadvantages and the production of polymer must be conducted by complicated process. Therefore improvement has been required.

Various methods for improving a catalyst performance have been proposed as mentioned above. Among them the modification treatment of the starting titanium component by various modifiers is disclosed, for example, in U.S. Pat. No. 3850899, Japanese Patent Publication No. 48638/74 and British Pat. No. 1370559.

As set forth in Comparative Examples given hereinafter, these methods are effective to some degree with respect of improvements in the catalyst activity, however, during the modification treatment the titanium component is divided to fine particles so that the preparation of polymer in a commercial scale encounters difficulties as mentioned above.

SUMMARY OF THE INVENTION

An object of this invention is to provide a process for the polymerization of ethylene or α-olefins for forming polymers with a narrow particle size distribution, in which the content of fine powders is extremely reduced.

Another object of this invention is to provide ethylene or α-olefin polymers having a high stereoregularity.

A further object of this invention is to provide a modified titanium component having a narrow particle size distribution, in which the content of fine particles is extremely reduced, and having a high catalyst performance.

The foregoing and other objects can be attained by polymerizing ethylene or α-olefins with use of a catalyst comprising.

(A) a modified titanium component obtained by the steps of:

(1) subjecting the starting titanium component of Ziegler solid catalysts together with an inert organic solvent and a modifier to wet pulverizing, (2) washing the pulverized products obtained with an inert organic solvent and separating them, (3) subjecting the resulting products to dry pulverizing, and (4) subjecting the pulverized products thus obtained to a modification treatment of contacting with an inert organic solvent or a mixture thereof with a modifier and separating from the solvent, and (5) in the course of the above steps, conducting a copulverization together with ethylene or α-olefins in a small amount of not more than about 10% by weight based on said starting titanium component and an organoaluminum compound of the formula, $$Al\ R_m X_{3-m}$$

wherein R is an alkyl or aryl group, X is hydrogen or a halogen atom and m is 1 to 3, in the wet pulverizing of said step (1) or the dry pulverizing of said step (3), or after the washing and separating of said step (2), and (B) an organoaluminum compound represented by the formula, $$Al\ R'_m X'_{3-m}$$

wherein R' is an alkyl or aryl group, X' is hydrogen or a halogen atom and m is 1 to 3.

The modifier which is used in the preparation of the above component (A) is selected from the group consisting of (i) an oxygen-, sulphur-, phosphor-, nitrogen- or silicon-containing organic compound, (ii) a combination of said organic compound of the item (i) with aluminum halides, (iii) an organoaluminum compound and (iv) Lewis acid.

DETAILED DESCRIPTION OF THE INVENTION

The starting material which is used in the preparation of the component (A) is titanium trichloride or compositions comprising titanium trichloride as the main component, for example titanium trichloride obtained by reduction of TiCl$_4$ with hydrogen, a eutectic material of TiCl$_3$ with a metal chloride obtained by reduction of TiCl$_4$ with a metal and a titanium trichloride composition obtained by reduction of TiCl$_4$ with a Si—H bond containing compound or an organoaluminum compound.

The titanium trichloride or its compositions may be pre-pulverized to fine particles prior to the use.

For the preparation of the component (A) the starting material is treated in accordance with the following steps:

(1) Step of wet pulverizing of the starting Ti material together with an inert organic solvent and a modifier:

With the wet pulverizing, the starting Ti material is effectively pulverized to fine particles, and the pulverized products are prevented from agglomeration of particles and accompanied by a good contact with a modifier.

Further, soluble components which are formed during the pulverization are acceleratedly dissolved into the inert organic solvent, though the pulverization mechanism and the structure of pulverized products are not yet elucidated sufficiently.

The inert organic solvent which may be used includes aliphatic, alicyclic or aromatic hydrocarbons, halogen derivatives thereof or mixtures thereof, and preferred examples are hexane, heptane, benzene, toluene, xylene, monochlorobenzene and cyclohexane.

The modifiers which may be used are disclosed in detail in our co-pending Patent Application No. 797227 filed May 16, 1977, which are selected from the group consisting of items (i) to (iv) described hereunder. The preferred examples of the modifier are set forth hereunder, but numerous examples described in said co-pending application are also included in this invention.

(i) Oxygen-, sulphur-, phosphor-, nitrogen- or silicon-containing organic compounds:

As for oxygen-containing organic compounds, for example, diethyl ether, di-n-butyl ether, di-iso-amyl ether, diphenyl ether, ditolyl ether, di(2-chlorophenyl) ether, diethyl ketone, diphenyl ketone, ethyl acetate and ethyl benzoate are preferred. As for sulphur-containing organic compounds, diethyl thioether di-n-propyl thioether, dibenzyl thioether, diphenyl thioether, n-dodecyl thioalcohol and thiophenol are preferred.

As for phosphor-containing organic compounds, for example, triphenylphosphine, triphenyl phosphite, triphenylphosphine oxide and triphenyl phosphate are preferred.

As for nitrogen-containing organic compounds, for example, triethylamine, triphenylamine, phenylisocyanate, azobenzene and acetonitrile are used.

As for silicon-containing organic compounds, for example, tetrahydrocarbylsilanes, halogen derivatives thereof, linear or cyclic organopolysilanes and siloxane polymers are used.

(ii) Combination of aluminum halides with the organic compound of the above item (i):

Preferred examples of aluminum halides are aluminum trichloride and aluminum tribromide. The organic compound and aluminum halide components may be added separately or used in the form of a mixture thereof, a reaction product or complex thereof.

Preferred examples of the reaction product or complex are diphenylether-aluminum trichloride complex, diethylether-aluminum trichloride complex, thiophenol-aluminum trichloride reaction products and diethylthioether-aluminum trichloride reaction products.

(iii) Organoaluminum compounds:

Examples of these compounds are diethylaluminum monochloride, diisopropylaluminum monochloride, ethylaluminum sesquichloride and ethylaluminum dichloride.

(iv) Lewis acids:

Examples of these compounds are titanium tetrachloride, boron fluoride, boron chloride and silicon tetrachloride.

The above-mentioned organic solvent is used in an amount of 0.1 to 100 parts, preferably 0.3 to 50 parts by weight based on titanium trichloride or its compositions. Also, the modifier is used in an amount of 0.5 to 500%, preferably 2 to 200% by mol based on titanium trichloride or its compositions.

The organic solvent and modifier may usually be added before the pulverization treatment, but may be added in the course of pulverization or divided in two or more times.

The pulverization treatment may be conducted in substantially the absence of oxygen and water by means of the conventional pulverizers such as a ball mill, vibration mill, column mill and jet mill.

The pulverization temperature is not particularly defined, but it is generally in the range of $-30°$ to $150°$ C.

The pulverization time is in general in the range of 1 to 100 hours.

(2) Step of washing pulverized products with an inert organic solvent and separating them:

The pulverized products obtained by the step (1) are then washed with the same inert organic solvent as mentioned above and separated by such means as decantation, filtration and centrifuging. With the treatment of the step (2), an excess of the modifier present in the pulverized products and a part or all of the soluble components are removed.

The organic solvent, modifier and other volatile components are then vapourized by drying. The drying means and conditions are not particularly limited, and the usual method of heating under normal pressure or reduced pressure and drying is used in general. Also, the drying may be effected by means of pulverization prior to the next step (3) to vapourize the volatile components.

(3) Step of dry pulverizing:

With this dry pulverizing, particle sizes of the Ti component are controlled as described hereinafter. The dry pulverizing is not particularly limited in the means and conditions, and may be effected by the pulverization method as mentioned in the step (1).

(4) Step of modification treatment:

The pulverized products obtained by the step (3) are brought into contact with the same organic solvent as mentioned above or mixtures thereof with the modifier selected from the group of (i) to (iv) as defined above and then, separated from the organic solvent.

The modification treatment may be effected in various modes of embodiment depending upon types of the starting material and purposes, for example, by washing the pulverized product with the organic solvent and separating; by washing the organic solvent and then contacting with a mixture of the organic solvent with the modifier, followed by separating: or by repeatedly contacting with different types of the organic solvent or mixtures thereof with the modifiers, followed by separating.

The organic solvent is used in the range of 1 to 500 parts by weight based on 1 part by weight of the pulverized product and the washing is carried out at temperatures of 0° to 200° C.

After the treatment, the pulverized products are separated from the solvent by decantation, filtration or the like.

If desired, the solvent may be removed while heating under normal pressure or reduced pressure to dry the pulverized product. Further, these washing and separating procedures may be repeatedly effected several times, if desired.

The modifier is used in the range of 0.001 to 100 parts by weight, preferably 0.01 to 50 parts by weight based on 1 part by weight of the pulverized product.

The mixing ratio of the organic solvent to the modifier is not particularly limited and determined appropriately depending upon the type of the organic solvent and modifier.

The mixture of the organic solvent and the modifier is usually brought into contact with the pulverized product while allowing to stand or stirring at temperature of 0° to 200° C., though the contact conditions are not particularly limited. The contact treatment is carried out effectively using Soxhlet's extractor, a counter current contact column and the like.

After the contact treatment, the pulverized product is separated from the solvent by decantation, filtration or the like.

(5) Step of copulverizing together with a small amount of ethylene or α-olefins and an organoaluminum compound:

The copulverizing together with a small amount of ethylene or α-olefins and an organoaluminum compound is effected in the wet pulverizing of the step (1) or the dry pulverizing of the step (3), or after the washing and separating of the step (2).

In case of the wet pulverizing of the step (1), an organoaluminum compound and ethylene or α-olefins are added into a pulverizer at the beginning of or in the course of the wet pulverization, or after completion of the treatment and subsequently, copulverized.

In case of the dry pulverizing of the step (3), an organoaluminum compound and ethylene or α-olefins are added at the beginning of or in the course of the treatment and subsequently, copulverized.

Also, in case of the solvent washing and separating of the step (2), an organoaluminum compound and ethylene or α-olefins are added to the Ti component obtained after the washing and separating but prior to drying and subsequently, copulverized.

By the above copulverization treatment, particle sizes of the Ti component can be controlled. In connection with this, the copulverization treatment carried out in the wet pulverizing of the step (1) or after the washing and separating of the step (2) brings about the particle size controlling effect in cooperation with the dry pulverizing of the subsequent step (3).

Also, in case the copulverization treatment is carried out in the dry pulverizing of the step (3), the particle size controlling effect is attained in an one step.

The organoaluminum compound which may be used in the copulverization treatment is represented by the formula, $AlR_mX_{3-m}$ as described hereinbefore. Examples of these compounds are triethylaluminum, triisobutylaluminum, diethylaluminum monochloride, diisobutylaluminum monochloride, diethylaluminum monobromide, ethylaluminum sesquichloride and others. The organoaluminum compound is used in an amount of preferably, 0.01 to 100 moles based on 1.0 gram atom of titanium of the staring titanium component.

An amount of ethylene or α-olefins to be added in the copulverization treatment are over about 0.01% by weight based on the starting titanium component, and the range of 0.1 to 10 weight % is preferred.

Lower α-olefins such as propylene and butene-1 may be used as the above-mentioned α-olefin, but they are not necessarily the same as monomers used in polymerization by a catalyst. The addition of ethylene or α-olefins may be effected at once in the course of copulverization or divided in two or more times, or continuously.

The copulverization means and conditions may be selected appropriately from the conditions as set forth in the pulverization of the step (1). The copulverization may be also effected in the presence of a small amount of hydrogen.

If an amount of the olefin is less than about 0.01 weight %, for example, with 0.005 weight %, the effect of controlling particle sizes can not be obtained. On the other hand, when the amount exceeds about 10 weight %, for example, with 15 weight %, the particle size controlling effect is attained, but the resulting titanium component brings about formation of polymers having ununiform particle shapes as well as ununiform particle sizes and therefore, the polymer bulk density is lowered. Further, with the amount of 20 weight %, the copulverized products are solidified on the wall of a pulverizer during the dry pulverizing so that a powdery catalyst can not be obtained.

The modified Ti component prepared according to this invention has a narrow particle size distribution, in which the content of fine particles of less than 5μ in diameter is below several percent by weight. Further, by polymerizing or copolymerizing olefins with use of the modified Ti component, there are provided polymers or copolymers with a narrow particle size distribution, in which the content of fine powders is extremely reduced.

Surprisingly, it has been further found that the use of the modified Ti component of this invention gives unexpected effects that polymerization or copolymerization of olefins is advanced with a rapid polymerization velocity and polymers are obtained with a high stereoregularity, as compared with use of the Ti component modified by the conventional methods.

The following is considered to be the reason why the particle sizes of the Ti component are controlled according to this invention, but it should be noted that this invention is not bound by this theoretical explanation.

In case the copulverization treatment of the step (5) is carried out in the wet pulverizing of the step (1) or after the washing and separating of the step (2), a small amount of polyethylene or poly-α-olefin is formed by polymerization of a small amount of ethylene or α-olefins added, and the polymers are dispersed uniformly in the Ti component and act as a binding agent among the resulting particles in the dry pulverizing of the next step (3) so that the pulverized products agglomerate to appropriate particle sizes.

Also, in case the copulverization treatment of the step (5) is carried out in the dry pulverizing of the step (3), the pulverization and the agglomeration among particles due to the formation of polymers are attained in an one step. Thus, the agglomerated titanium component is allowed to maintain the particle sizes in the modification treatment of the next step (4) without redispersing and dividing to fine particles.

Accordingly, polymers with a highly controlled particle size are obtained by polymerization of olefins with use of the Ti component prepared according to this invention.

The titanium component obtained by effecting the copulverization treatment of the step (5) according to this invention exhibits effects that the polymerization of olefins is advanced with a rapid velocity and polymers are obtained with a high stereoregularity as compared with a titanium component prepared without the copulverization treatment of the step (5). These are apparent from a comparison between Examples and Comparative Examples as described hereinafter.

The organoaluminum compound which may be used as another catalyst component (B) in this invention is represented by the formula,

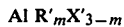

Al R'$_m$X'$_{3-m}$ wherein R', X' and m are as defined hereinbefore, which is the same as that used in the copulverization step of the Ti component. Therefore examples of the organoaluminum compound include the same compounds as exemplified hereinbefore.

The ratio of the Ti component (A) to the organoaluminum compound (B) used in this invention may be varied within a wide range. In general, the molar ratio of component (B) to component (A) is preferred to be in the range of 1–500.

The catalyst of this invention is useful not only for homopolymerization of ethylene or α-olefins, but also for copolymerization of these monomers, for example, for copolymerization of ethylene with propylene, butene-1, pentene-1, hexene-1, or 4-methyl-pentene-1, or of propylene with butene-1 or hexene-1.

The polymerization reaction is carried out in the conventional method using the usual reaction conditions. The polymerization temperature is usually in the range of 20°–300° C., preferably 50°–200° C., and the pressure is in the range of from normal pressure to 200 atm., preferably from normal pressure to 150 atm.

In the polymerization reaction, a solvent such as an aliphatic, alicyclic or aromatic hydrocarbon or mixture thereof may be used and may be, for example, propane, butane, pentane, hexane, heptane, cyclohexane, benzene, toluene or mixtures thereof.

Also, a bulk polymerization may be employed using liquid monomers themselves as the solvent. Alternatively, the polymerization reaction may be conducted in the vapour phase wherein gaseous monomers are directly contacted with the catalyst without use of a solvent.

The molecular weight of polymers produced by the method of this invention varies depending on the manner of reaction, type of catalyst and polymerization conditions. However, the molecular weight may be controlled by adding to the reaction system, for example, hydrogen, an alkyl halide and a dialkyl zinc, if necessary.

This invention will be illustrated by way of the following examples. Also, for the purpose of comparison there are set forth Comparative Examples which are beyond the scope of this invention.

EXAMPLE 1

(1) Preparation of modified Ti component:

There was prepared a vibration mill provided with a pulverization pot of about 600 ml in capacity, in which about 80 steel balls of 12 mm in diameter were placed.

50 g of an eutectic composition of approx. TiCl$_3$.1/3AlCl$_3$ (hereinafter referred to as "Type A TiCl$_3$") obtained by reducing TiCl$_4$ with aluminum powders were added to the above pot under nitrogen atmosphere and pulverized for 40 hours. The pulverized products obtained are hereinafter referred to as "Type AA TiCl$_3$".

Next, 150 ml of n-heptane and 10 g of di-n-butyl ether were added and a wet pulverizing was effected for 3 hours.

The washing treatment of stirring the pulverized products with 250 ml of n-heptane at the boiling temperature of n-heptane for 20 minutes and thereafter, removing the supernatant liquid by decantation were repeated two times and then, the resulting products were dried at 60° C. under a reduced pressure of 1.0 mm Hg for 30 minutes. To 30 g of the dry products obtained was 1.0 ml of Al(C$_2$H$_5$)$_2$Cl added and pulverized for 15 minutes, and 200 ml of gaseous propylene were charged over 30 minutes under pulverizing and a further pulverization was effected for 3 hours.

The copulverized products were separated from the steel balls under nitrogen atmosphere. Next, 25 g of the Ti component thus obtained were added with 150 ml of n-heptane and stirred at the boiling temperature of n-heptane for 20 minutes and then, the n-heptane was removed by decantation. After conducting this procedure five times, 150 ml of n-heptane were added to obtain an activated Ti component in the form of suspension.

(2) Polymerization:

1.0 l of n-heptane, 0.40 g of the above activated Ti component and 1.0 ml of Al(C$_2$H$_5$)$_2$Cl were charged under nitrogen atmosphere into a stainless steel autoclave of 2.0 l in capacity.

After exhausting the nitrogen from the autoclave by means of a vacuum pump, hydrogen was fed till a partial pressure of 1.0 kg/cm$^2$ and then, propylene was fed till a vapour pressure of 2 kg/cm$^2$.Gauge. The autoclave was heated and after 5 minutes, the inner temperature was elevated to 70° C., at the temperature of which polymerization was continued. During the polymerization, propylene was continuously forced into the autoclave to maintain the inner pressure at 5 kg/cm$^2$.Gauge.

After 2.05 hours, the amount of propylene polymerized reached about 500 g, then the feeding of propylene was discontinued, and 300 ml of methanol were added and stirred for 30 minutes to deactivate the catalyst.

After cooling the autoclave, the contents were removed, washed three times with 200 ml of water at 60° C., filtered and dried at 60° C. under reduced pressure. Thus 520 g of a white polypropylene were obtained.

Limiting viscosity number (135° C., tetralin): 1.65 dl/g

Bulk density: 0.43 g/ml

Extraction residue with boiling n-heptane (hereinafter referred to as "Powder-II"): 96.6%

On the other hand, 15 g of amorphous polypropylene were obtained by vapourizing the filtrate.

Polymerization activity of catalyst (Formation rate of polymer per gram of activated Ti per hour): 634 g/g.hr Ratio of extraction residue polymer with boiling n-heptane to the whole polymer (hereinafter referred to as a mere "Total II"): 93.8%.

Content of fine powders having a size smaller than 200 mesh: 7.0 weight %

COMPARATIVE EXAMPLES 1-3

Using a Type AA TiCl$_3$ as prepared in the method of Example 1 (1) (Comparative Example 1), a Ti catalyst component prepared omitting the feeding of gaseous propylene in the dry pulverizing in the method of Example 1 (1) (Comparative Example 2) and a Ti catalyst component prepared omitting the heptane washing in the modification step in the method of Example 1 (1), respectively, polymerization was carried out in the same manner as in Example 1 (2).

The results obtained are set forth in Table 1 together with Example 1 for the purpose of comparison.

Table 1

|  | Polymerization Time, hr | Yield of Powdery PP, g | Yield of Amorphous PP, g | Powder II % | Total II % | Polymerization Activity, g/g.hr | Limiting Viscosity Number dl/g | Bulk Density g/ml | Content of Fine Powders, wt % |
|---|---|---|---|---|---|---|---|---|---|
| Example 1 | 2.05 | 505 | 15 | 96.6 | 93.8 | 634 | 1.65 | 0.43 | 7.0 |
| Comparative Ex. 1 | 5.20* | 476 | 39 | 95.2 | 88.0 | 218 | 1.68 | 0.40 | 23.6 |
| Comparative Ex. 2 | 2.75 | 503 | 20 | 96.1 | 92.4 | 475 | 1.63 | 0.40 | 20.3 |
| Comparative Ex. 3 | 4.50* | 485 | 40 | 95.0 | 87.8 | 259 | 1.65 | 0.42 | 6.5 |

PP : Polypropylene
*0.45 g of TiCl$_3$ component were used.

EXAMPLE 2

(1) Preparation of modified Ti component:

In accordance with the procedure of Example 1 (1), a mixture of 30 g of a Type A TiCl$_3$, 3.9 g of aluminum chloride-diphenyl ether complex and 150 ml of n-heptane was subject to wet pulverizing for 40 hours, and the resulting products were subject to washing treatment and drying and then, copulverized together with propylene and Al(C$_2$H$_5$)$_2$Cl.

Next, to 25 g of the pulverized products after separating were 150 ml of n-heptane and 20 g of diisoamyl ether added and stirred at the boiling temperature of n-heptane for 20 minutes and then, the supernatant liquid was removed by decantation. The washing treatment of adding 150 ml of n-heptane, stirring at the boiling temperature for 20 minutes and removing the supernatant liquid was repeated four times.

(2) Polymerization:

Using 0.30 g of the activated Ti obtained above, polymerization was carried out in the same manner as in Example 1 (2).

After 1.90 hours polymerization, 513 g of a powdery PP and 17 g of an amorphous PP were obtained.

Polymerization activity: 911 g/g.hr
Limiting viscosity number: 1.63 dl/g
Bulk density: 0.43 g/ml
Powder II: 96.3%
Total II: 93.5%
Content of fine powders: 6.5%

EXAMPLE 3

(1) Preparation of modified Ti component:

The procedure of Example 1 (1) was repeated until the step of copulverizing titanium trichloride together with Al(C$_2$H$_5$)$_2$Cl and gaseous propylene. To 25 g of the pulverized products after separating from the steel balls were 150 ml of n-heptane and 20 g of di-n-butyl ether added and stirred at the boiling temperature of n-heptane for 20 minutes and then, the supernatant liquid was removed by decantation. The washing treatment with 150 ml of n-heptane was conducted three times.

Subsequently, 150 ml of n-heptane and 30 g of TiCl$_4$ were added and stirred at the boiling temperature of n-heptane for 20 minutes and then, the supernatant liquid was removed by decantation. The washing treatment with 150 ml of n-heptane was conducted three times and then, 150 ml of n-heptane were added to obtain an activated Ti component in the form of suspension.

(2) Polymerization:

Using 0.15 g of the activated Ti component obtained, polymerization was conducted in the same manner as in Example 1 (2).

After 2.42 hours polymerization, 509 g of a powdery PP and 7 g of an amorphous PP were obtained.

Polymerization activity: 1421 g/g.hr
Limiting viscosity number: 1.59 dl/g
Bulk density: 0.43 g/ml
Powder II: 97.3%
Total II: 96.0%
Content of fine powers: 7.2%

EXAMPLE 4

The preparation of a modified Ti component was conducted varying the step of copulverizing together with Al(C$_2$H$_5$)$_2$Cl and propylene in accordance with the method of Example 3 (1) as illustrated below.

Type AA TiCl$_3$→Wet pulverizing$^{(1)}$→Wet pulverizing$^{(2)}$→Washing$^{(3)}$→Drying$^{(4)}$→Pulverizing$^{(5)}$→Modification treatment$^{(6)}$→Washing$^{(7)}$→Modification treatment$^{(8)}$→Washing$^{(9)}$.

After the wet pulverizing step (1) with use of di-n-butyl ether and n-heptane, 1.0 ml of Al(C$_2$H$_5$)$_2$Cl was added in the step (2) and 300 ml of gaseous propylene were fed over 3.0 hours while continuing the wet pulverizing. The dry products obtained in the drying step (4) were then pulverized in the pulverizing step (5) and thereafter, treated in the same manner as in Example 3 (1).

Using the Ti component thus obtained, polymerization was conducted in the same manner as in Example 1 (2). The results obtained are set forth in Table 2.

EXAMPLE 5

The preparation of a modified Ti component was conducted varying the step of copulverizing together with $Al(C_2H_5)_2Cl$ and propylene in accordance with the method of Example 3 (1) as illustrated below.

Type AA $TiCl_3 \rightarrow$ Wet pulverizing(1) $\rightarrow$ Washing(2) $\rightarrow$ Wet pulverizing(3) $\rightarrow$ Drying(4) $\rightarrow$ Pulverizing(5) $\rightarrow$ Modification treatment(6) $\rightarrow$ Washing(7) $\rightarrow$ Modification treatment(8) $\rightarrow$ Washing(9).

After the washing step (2) with use of n-heptane, 150 ml of n-heptane and 1.0 ml of $Al(C_2H_5)_2Cl$ were added in the step (3) and 300 ml of gaseous propylene were fed over three hours while continuing the wet pulverizing. The dry products obtained in the drying step (4) were then pulverized in the pulverizing step (5) and thereafter, treated in the same manner as in Example 3 (1).

Using the Ti component thus obtained, polymerization was conducted in the same manner as in Example 1 (2).

The results obtained are set forth in Table 2.

COMPARATIVE EXAMPLES 4–7

These Examples are to make a comparison with Examples 3–5. Using a Ti component prepared omitting the wet pulverizing step (2) with use of $Al(C_2H_5)_2Cl$ and propylene in the catalyst preparing method of Example 4 (Comparative Example 4), a Ti component prepared omitting the steps (2), (4) and (5) in the catalyst preparing method of Example 4 (Comparative Example 5), a Ti component prepared omitting the feeding of propylene in the dry pulverizing in the method of Example 3 (1) (Comparative Example 6) and a Ti component prepared omitting the wet pulverizing in the method of Example 3 (1), respectively, polymerization was conducted in the same manner as in Example 1 (2).

The results obtained are set forth in Table 3.

Table 3

| | Polymerization Time, hr | Yield of Powdery PP, g | Yield of Amorphous PP, g | Powder II % | Total II % | Polymerization Activity, g/g.hr | Limiting Viscosity Number dl/g | Bulk Density g/ml | Content of Fine Powders % |
|---|---|---|---|---|---|---|---|---|---|
| Comparative Example 4 | 3.0 | 353 | 9 | 96.5 | 94.1 | 804 | 1.67 | 0.28 | 53 |
| Example 5 | 3.0 | 158 | 5 | 97.0 | 94.0 | 326 | 1.53 | 0.15 | 89 |
| Example 6 | 3.0 | 363 | 10 | 96.8 | 94.2 | 829 | 1.66 | 0.30 | 49 |
| Example 7 | 3.0 | 340 | 8 | 98.0 | 95.7 | 773 | 1.63 | 0.43 | 7.0 |

EXAMPLES 6–28

Various modifiers as set forth in Table 4 were used instead of di-n-butyl ether which was used in the wet pulverizing in the catalyst preparing method of Example 1 (1).

The effects of this invention were also confirmed in case the method of Example 1 (1) was conducted varying the type and amount of the olefin used in the dry pulverizing and the type of the solvent used in the washing treatment as set forth in Table 4. In case of the solvent having a boiling point of not higher than 100° C., the washing treatment was conducted at the boiling temperature and in case of higher than 100° C., at 100° C.

Table 2

| | Polymerization Time, hr | Yield of Powdery PP, g | Yield of Amorphous PP, g | Powder II % | Total II % | Polymerization Activity g/g.hr | Limiting Viscosity Number dl/g | Bulk Density g/ml | Content of Fine Powders, wt % |
|---|---|---|---|---|---|---|---|---|---|
| Example 4 | 2.70 | 510 | 10 | 97.0 | 95.1 | 1283 | 1.53 | 0.41 | 10.3 |
| Example 5 | 2.65 | 508 | 9 | 97.1 | 95.4 | 1300 | 1.60 | 0.42 | 9.8 |

Polymerization was conducted in the same manner as in Example 1 (2). The results obtained are also set forth in Table 4.

Further, control polymers obtained by polymerization with use of a Ti component which was prepared omitting the dry pulverizing are set forth in Table 4.

Table 4

| | Ti Component Preparation | | | | Polymerization | | | | | Control Polymers | |
|---|---|---|---|---|---|---|---|---|---|---|---|
| | Wet Pulverizing | | Dry Pulverizing | Washing Treatment | | | | | Content of Fine | Content of Fine | |
| Ex. No. | Component 1 | Component 2 | Additives | Solvents | Time hr | Activity g/g.hr | Total II, % | Bulk Density g/ml | Powders, wt % | Powders, wt % | Bulk Density g/ml |
| 6 | Diphenyl ether-$AlCl_3$ complex, 7.0 g | Non | Ethylene 300 ml | Toluene | 2.00 | 638 | 94.5 | 0.42 | 6.0 | 86.5 | 0.16 |
| 7 | Diphenyl ether-$AlBr_3$ complex, 7.0 g Methylphe- | " | " | " | 1.89 | 681 | 94.6 | 0.43 | 7.0 | | |

Table 4-continued

| | Ti Component Preparation | | | | Polymerization | | | | Control Polymers | |
|---|---|---|---|---|---|---|---|---|---|---|
| | Wet Pulverizing | | Dry Pulverizing | Washing Treatment | Time | Activity | Total | Bulk Density | Content of Fine Powders, | Content of Fine Powders, | Bulk Density |
| Ex. No. | Component 1 | Component 2 | Additives | Solvents | hr | g/g.hr | II, % | g/ml | wt % | wt % | g/ml |
| 8 | nyl thioether-AlCl₃ complex, 4.0 g | " | " | " | 2.20 | 568 | 94.8 | 0.43 | 7.1 | | |
| 9 | Triphenyl phosphine-AlCl₃ complex, 5.0 g | " | Ethylene 100 ml | Chlorobenzene | 2.15 | 605 | 95.0 | 0.41 | 7.1 | 85.0 | 0.16 |
| 10 | Triphenyl phosphate-AlCl₃ complex, 2.0 g | Non | Butene-1 200 ml | Chlorobenzene | 2.15 | 587 | 94.9 | 0.43 | 6.8 | | |
| 11 | Tris-N, lphosphor-amide-AlCl₃ complex, 2.0 g | " | " | " | 2.30 | 560 | 95.0 | 0.43 | 7.3 | 73.0 | 0.15 |
| 12 | Thiophenol-AlCl₃ reaction products, 2.0 g | " | " | " | 2.20 | 568 | 95.0 | 0.42 | 6.0 | | |
| 13 | Diphenyl ether, 5.0 g | AlCl₃ 1.6 g | Ethylene 200 ml | Benzene | 1.80 | 722 | 94.0 | 0.41 | 5.9 | | |
| 14 | Diphenyl ether, 5.0 g | AlBr₃ 1.6 g | Ethylene 200 ml | Benzene | 1.85 | 676 | 93.9 | 0.41 | 7.8 | | |
| 15 | " | AlI₃ 1.6 g | " | " | 1.75 | 714 | 93.8 | 0.42 | 7.0 | | |
| 16 | Diphenyl ketone, 1.1 g | AlCl₃ 1.3 g | Propylene 300 ml | Cyclohexane | 2.20 | 582 | 93.8 | 0.44 | 7.0 | | |
| 17 | Ethyl benzoate, 1.0 g | AlCl₃ 1.3 g | " | " | 2.23 | 583 | 94.0 | 0.41 | 7.0 | | |
| 18 | Diphenyl phosphinous bromide, 1.0 g | " | " | " | 2.35 | 553 | 94.0 | 0.42 | 7.8 | 87.2 | 0.13 |
| 19 | Thiophenol 1.0 g | " | " | Benzene | 2.18 | 568 | 94.6 | 0.43 | 7.3 | | |
| 20 | Triethyl amine, 1.0 g | AlCl₃ 1.3 g | Ethylene 300 ml | Benzene | 2.33 | 536 | 94.1 | 0.41 | 7.9 | | |
| 21 | Phenylisocyanate, 1.0 g | " | " | n-Heptane | 2.33 | 540 | 94.0 | 0.41 | 7.2 | | |
| 22 | Benzonitrile 0.5 g | " | " | " | 2.33 | 553 | 94.1 | 0.43 | 6.8 | | |
| 23 | Octamethylcyclotetrasiloxane, 1.0 g | Non | " | " | 2.00 | 650 | 93.5 | 0.42 | 5.0 | | |
| 24 | Diethyl ketone 1.0 g | Non | Ethylene 300 ml | n-Hexane | 2.15 | 581 | 93.8 | 0.43 | 7.3 | | |
| 25 | Ethylaluminum monochloride 3.0 g | " | " | " | 2.00 | 650 | 93.9 | 0.42 | 7.2 | 68.3 | 0.15 |
| 26 | Ethylaluminum dichloride 3.0 g | " | " | n-Heptane | 2.05 | 610 | 93.0 | 0.42 | 7.0 | | |
| 27 | TiCl₄ | " | " | " | 2.10 | 595 | 94.1 | 0.42 | 7.2 | 87.0 | 0.13 |

Table 4-continued

| Ex. No. | Ti Component Preparation | | | | Polymerization | | | | | Control Polymers | |
|---|---|---|---|---|---|---|---|---|---|---|---|
| | Wet Pulverizing | | Dry Pulverizing | Washing Treatment Solvents | Time hr | Activity g/g.hr | Total II, % | Bulk Density g/ml | Content of Fine Powders, wt % | Content of Fine Powders, wt % | Bulk Density g/ml |
| | Component 1 | Component 2 | Additives | | | | | | | | |
| 28 | 5.0 g SiCl₄ 5.0 g | " | " | " | 2.10 | 580 | 94.0 | 0.43 | 7.0 | | |

EXAMPLES 29–33

Various modifiers as set forth in Table 5 were used instead of di-n-butyl ether which was used in the first modification step in the catalyst preparing method of Example 3 (1).

The effects of this invention were also confirmed in case the method of Example 3 (1) was conducted varying the type and amount of the olefin used in the dry pulverizing and the type of the solvent used in the washing treatment as set forth in Table 5.

Polymerization was conducted in the same manner as in Example 1 (2). The results obtained are also set forth in Table 5.

Further, control polymers obtained by polymerization with use of a Ti component which was prepared omitting the dry pulverizing are set forth in Table 5.

EXAMPLES 34–43

Various modifiers as set forth in Table 6 were used instead of di-n-butyl ether which was used in the wet pulverizing and 1st modification steps in the catalyst preparing method of Example 3 (1).

The effects of this invention were also confirmed in case the method of Example 3 (1) was conducted varying the type and amount of the organoaluminum compound used in the dry pulverizing as set forth in Table 6.

Polymerization was conducted in the same manner as in Example 1 (2). The results obtained are also set forth in Table 6.

Further, control polymers obtained by polymerization with use of a Ti component which was prepared omitting the dry pulverizing are set forth in Table 6.

Table 5

| Ex. No. | Ti Component Preparation | | | | | Polymerization | | | | Control Polymers | |
|---|---|---|---|---|---|---|---|---|---|---|---|
| | 1st Modification Step | | Dry Pulverizing | | Washing Treatment Solvents | Time hr | Activity g/g.hr | Total II, % | Bulk Density g/ml | Content of Fine Powders, wt % | Content of Fine Powders, wt % | Bulk Density g/ml |
| | Modifiers | Amount, g | Olefins | Amount, ml | | | | | | | | |
| 29 | Diisoamyl ether | 20 | Ethylene | 300 | n-Heptane | 2.50 | 1333 | 96.2 | 0.43 | 7.8 | 83 | 0.25 |
| 30 | Diisoamyl ether | 20 | Propylene | 300 | n-Heptane | 2.45 | 1388 | 95.8 | 0.41 | 8.3 | | |
| 31 | Diisoamyl ether | 20 | Butene | 300 | Benzene | 2.50 | 1387 | 95.7 | 0.42 | 6.7 | | |
| 32 | Triphenyl phosphine | 3 | Ethylene | 200 | n-Hexane | 2.35 | 1362 | 96.3 | 0.43 | 7.0 | | |
| 33 | Methylphenyl ether | 10 | Ethylene | 200 | Toluene | 2.40 | 1403 | 95.7 | 0.42 | 6.3 | 70 | 0.28 |

Table 6

| Ex. No. | Ti Component Preparation | | | | Polymerization | | | | | Control Polymers | |
|---|---|---|---|---|---|---|---|---|---|---|---|
| | Dry Pulverizing | | Wet Pulverizing and 1st Modification Treatment | | Time hr | Activity g/g.hr | Total II, % | Bulk Density g/ml | Content of Fine Powders, wt % | Content of Fine Powders, wt % | Bulk Density g/ml |
| | Organoalum. Compds. | Amount, ml | Modifiers | Amount, g | | | | | | | |
| 34 | Al(C₂H₅)₂Cl | 1.0 | Diisoamyl ether | 20 | 2.40 | 1417 | 96.3 | 0.43 | 7.0 | | |
| 35 | Al(C₂H₅)₃ | " | Diphenyl ether | 20 | 2.50 | 1333 | 96.5 | 0.41 | 5.8 | 70.3 | 0.18 |
| 36 | Al(C₂H₅)₂H | " | Diphenyl ketone | 3.0 | 2.70 | 1259 | 95.0 | 0.43 | 7.0 | | |
| 37 | Al(C₂H₅)₂Cl | " | Methylphenyl thioether | 3.0 | 2.85 | 1183 | 97.0 | 0.41 | 7.0 | 85.0 | 0.11 |
| 38 | " | 2.0 | Triphenyl phosphine | 5.0 | 2.55 | 1357 | 96.5 | 0.41 | 6.3 | | |
| 39 | Al(C₂H₅)₂Cl | 1.0 | Triethyl amine | 5.0 | 2.75 | 1212 | 96.0 | 0.42 | 6.3 | | |
| 40 | " | " | Dimethylpolysiloxane | 10 | 2.50 | 1360 | 95.3 | 0.41 | 6.5 | 50.5 | 0.20 |
| 41 | " | " | Ethylaluminum sesquich- | 5 | 2.50 | 1333 | 96.0 | 0.42 | 7.0 | | |

Table 6-continued

| Ex. No. | Ti Component Preparation — Dry Pulverizing Organoalum. Compds. | Amount, ml | Wet Pulverizing and 1st Modification Treatment Modifiers | Amount, g | Polymerization Time hr | Activity g/g.hr | Total II, % | Bulk Density g/ml | Content of Fine Powders, wt % | Control Polymers Content of Fine Powders, wt % | Bulk Density g/ml |
|---|---|---|---|---|---|---|---|---|---|---|---|
|  |  |  | loride |  |  |  |  |  |  |  |  |
| 42 | " | " | Ethylaluminum dichloride | 5 | 2.50 | 1387 | 96.0 | 0.43 | 7.0 | 83.0 | 0.15 |
| 43 | " | 0.5 | Silicon tetrachloride | 5 | 3.0 | 1133 | 95.7 | 0.41 | 6.9 |  |  |

EXAMPLE 44

Using the modified Ti component prepared in Example 3 (1), a bulk polymerization of propylene was conducted in accordance with the following method:

A suspension of 0.05 g of the activated Ti component in 30 ml of heptane and 0.5 ml of $Al(C_2H_5)_2Cl$ were charged under nitrogen atmosphere into a stainless steel autoclave of 6 l in capacity.

After exhausting nitrogen from the autoclave by means of a vacuum pump, 1.5 Nl of hydrogen and 2.5 kg of propylene were fed. The autoclave was heated and after 15 minutes, the inner temperature was elevated to 70° C., at the temperature of which polymerization was conducted.

After 5 hours the autoclave was cooled, the contents were removed and dried at 60° C. under reduced pressure and thus, 1020 g of a powdery polypropylene were obtained.

Powder II: 96.7%
Limiting Viscosity number: 1.53 dl/g
Bulk density: 0.46 g/ml
Content of fine powders: 0.5 wt %

What is claimed is:

1. A process for the polymerization of ethylene or an α-olefin which comprises polymerizing ethylene or an α-olefin with the use of a catalyst comprising
    (A) a modified titanium component obtained by the steps of:
        (1) wet pulverizing a starting titanium component comprising titanium trichloride or its compositions having titanium trichloride as the main component together with an inert organic solvent and a modifier,
        (2) washing the pulverized products obtained in step (1) with an inert organic solvent and separating the washed products;
        (3) dry pulverizing the products obtained in step (2), and
        (4) contacting the pulverized products obtained in step (3) with an inert organic solvent or with a mixture of an inert organic solvent and a modifier, followed by separating the product from the solvent, and
        (5) in the wet pulverizing of step (1), the dry pulverizing of step (3) or after the washing and separating of step (2), conducting a copulverization treatment together with (a) ethylene or an α-olefin in an amount of about 0.01 to 10% by weight based on said starting titanium component and (b) an organoaluminum compound of the formula $$AlR_m X_{3-m}$$

wherein R is an alkyl or aryl group, X is hydrogen or a halogen atom and m is 1 to 3, wherein said modifier in steps (1) and (4) is selected from the group consisting of (i) an oxygen-, sulphur-, phosphor-, nitrogen- or silicon-containing organic compound, (ii) a combination of said organic compound of the item (i) with an aluminum halide, (iii) an organoaluminum compound or (iv) a Lewis acid; and
    (B) an organoaluminum compound represented by the formula $$AlR'_m X'_{3-m}$$

wherein R' is an alkyl or aryl group, X' is hydrogen or a halogen atom and m is 1 to 3.

2. The process of claim 1 wherein said starting titanium component is a pre-pulverized titanium trichloride or its compositions.

3. The process of claim 1, wherein said starting titanium component is selected from the group consisting of titanium trichloride obtained by reduction of $TiCl_4$ with hydrogen, a eutectic material of $TiCl_3$ with a metal chloride obtained by reduction of $TiCl_4$ with a metal or a titanium trichloride composition obtained by reduction of $TiCl_4$ with a Si-H bond containing compound or an organoaluminum compound.

4. The process of claim 1, wherein the inert organic solvent in step (1) is used in an amount of 0.1 to 100 parts by weight based on the said titanium trichloride or its compositions.

5. The process of claim 1, wherein the modifier in step (1) is used in an amount of 0.5 to 500% by mol based on said titanium trichloride or its compositions.

6. The process of claim 1, wherein the inert organic solvent in step (4) is used in an amount of 1 to 500 parts by weight based on 1 part by weight of the pulverized product.

7. The process of claim 1, wherein the organoaluminum compound in step (5) is selected from the group consisting of triethylaluminum, triisobutylaluminum, diethylaluminum monochloride, diisobutylaluminum monochloride, diethylaluminum monobromide or ethylaluminum sesquichloride and said organoaluminum compound in step (5) is used in an amount of 0.01 to 100 moles based on 1.0 gram atom of titanium of the starting titanium component.

8. The process of claim 1, wherein said α-olefin in step (5) is propylene or butene-1.

9. The process of claim 1, wherein said polymerization is homopolymerization of ethylene, copolymerization of ethylene with propylene, butene-1, pentene-1, hexene-1 or 4-methyl-pentene-1 or copolymerization of propylene with butene-1 or hexene-1.

10. A modified titanium catalyst for polymerization of ethylene or an α-olefin obtained by the steps of:
  (1) wet pulverizing a starting titanium component comprising titanium trichloride or its compositions having titanium trichloride as the main component together with an inert organic solvent and a modifier,
  (2) washing the pulverized products obtained in step (1) with an inert organic solvent and separating the washed products;
  (3) dry pulverizing the products obtained in step (2), and
  (4) contacting the pulverized products obtained in step (3) with an inert organic solvent or with a mixture of an inert organic solvent and a modifier, followed by separating the product from the solvent, and
  (5) in the wet pulverizing of step (1), the dry pulverizing of step (3) or after the washing and separating the step (2), conducting a copulverization treatment together with (a) ethylene or an α-olefin in an amount of about 0.01 to 10% by weight based on said starting titanium component and (b) an organoaluminum compound of the formula $$AlR_m X_{3-m}$$

wherein R is an alkyl or aryl group, X is hydrogen or a halogen atom and m is 1 to 3, wherein said modifier in steps and (4) is selected from the group consisting of (i) an oxygen-, sulphur-, phosphor-, nitrogen- or silicon-containing organic compound, (ii) a combination of said organic compound of the item (i) with an aluminum halide, (iii) an organoaluminum compound or (iv) a Lewis acid.

11. The catalyst of claim 10 wherein said starting titanium component is a pre-pulverized titanium trichloride or its compositions.

12. The catalyst of claim 10, wherein said starting titanium component is selected from the group consisting of titanium trichloride obtained by reduction of $TiCl_4$ with hydrogen, a eutectic material of $TiCl_3$ with a metal chloride obtained by reduction of $TiCl_4$ with a metal or a titanium trichloride composition obtained by reduction of $TiCl_4$ with a Si—H bond containing compound or an organoaluminum compound.

13. The catalyst of claim 10, wherein the inert organic solvent in step (1) is used in an amount of 0.1 to 100 parts by weight based on the said titanium trichloride or its compositions.

14. The catalyst of claim 10, wherein the modifier in step (1) is used in an amount of 0.5 to 500% by mol based on said titanium trichloride or its compositions.

15. The catalyst of claim 10, wherein the inert organic solvent in step (4) is used in an amount of 1 to 500 parts by weight based on 1 part by weight of the pulverized product.

16. The catalyst of claim 10, wherein the organoaluminum compound in step (5) is selected from the group consisting of triethylaluminum, triisobutylaluminum, diethylaluminum monochloride, diisobutylaluminum monochloride, diethylaluminum monobromide or ethylaluminum sesquichloride and said organoaluminum compound in step (5) is used in an amount of 0.01 to 100 moles based on 1.0 gram atom of titanium of the starting titanium component.

17. The catalyst of claim 10, wherein said α-olefin in step (5) is propylene or butene-1.

* * * * *